US009723557B2

(12) United States Patent
McLaughlin

(10) Patent No.: US 9,723,557 B2
(45) Date of Patent: Aug. 1, 2017

(54) METHODS FOR RECONNECTING TO A NETWORK

(71) Applicant: Motorola Mobility LLC, Chicago, IL (US)

(72) Inventor: Michael David McLaughlin, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/941,768

(22) Filed: Nov. 16, 2015

(65) Prior Publication Data

US 2017/0142654 A1 May 18, 2017

(51) Int. Cl.
*H04W 76/00* (2009.01)
*H04W 52/02* (2009.01)
*H04W 76/02* (2009.01)

(52) U.S. Cl.
CPC ..... *H04W 52/0216* (2013.01); *H04W 76/027* (2013.01); *H04W 76/028* (2013.01)

(58) Field of Classification Search
CPC ............................ H04W 76/023; H04W 76/00
USPC .......... 455/452.1, 423, 434, 515, 509, 67.11, 455/414.1, 414.2, 403
See application file for complete search history.

(56) References Cited

U.S. PATENT DOCUMENTS

| 8,948,789 | B2 | 2/2015 | Sadasivam et al. |
| 2008/0248747 | A1* | 10/2008 | Buckley ............... H04W 48/16 455/39 |
| 2012/0188876 | A1 | 7/2012 | Chow et al. |
| 2013/0155889 | A1* | 6/2013 | Brownworth ..... H04W 36/0083 370/252 |
| 2014/0274224 | A1 | 9/2014 | Patel et al. |
| 2016/0105291 | A1* | 4/2016 | Anchan ................ H04L 12/189 370/312 |
| 2016/0105500 | A1* | 4/2016 | Anchan ............... H04L 67/1051 370/329 |

* cited by examiner

*Primary Examiner* — John J Lee
(74) *Attorney, Agent, or Firm* — Yudell Isidore PLLC

(57) ABSTRACT

In a first embodiment, a method includes: entering a reduced communications performance environment, wherein a mobile device connected to a network loses connection to the network; attempting to reconnect to the network in the reduced performance environment without success; recording network connection attempt information; entering an improved performance environment, wherein the mobile device is reconnected to the network; and transmitting the network connection attempt information to a remote server. In a second embodiment, a method includes: consulting a network reconnection attempts profile previously sent from a cloud server to a mobile device; based on the network reconnections attempts profile, determining a network reconnection attempt schedule; and attempting to reconnect to the network according to the network reconnection attempt schedule until the mobile device is reconnected to the network.

23 Claims, 7 Drawing Sheets

METHODS FOR RECONNECTING TO A NETWORK

FIELD

The disclosure relates generally to the field of managing power consumption on an electronic device.

BACKGROUND

Mobile electronic devices consume power from a power source such as a battery. Some operations, such as communication over a network, may have high power consumption relative to other operations of the mobile electronic device. This is the case in situations such as when a mobile device does not detect a connection to the network and begins to scan for available hubs (e.g., Wi-Fi). The mobile device will continue scanning in a so-called "open-loop" fashion, at a fixed or variable frequency until it either detects a hub or runs out of battery.

SUMMARY

In a first embodiment, a method is disclosed. The method includes: entering a reduced communications performance environment, wherein a mobile device connected to a network loses connection to the network; attempting to reconnect to the network in the reduced performance environment without success; recording network connection attempt information; entering an improved performance environment, wherein the mobile device is reconnected to the network; and transmitting the network connection attempt information to a remote server.

In a second embodiment, a method of disclosed. The method includes: consulting a network reconnection attempts profile previously sent from a cloud server to a mobile device; based on the network reconnections attempts profile, determining a network reconnection attempt schedule; and attempting to reconnect to the network according to the network reconnection attempt schedule until the mobile device is reconnected to the network.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

Figure 1:
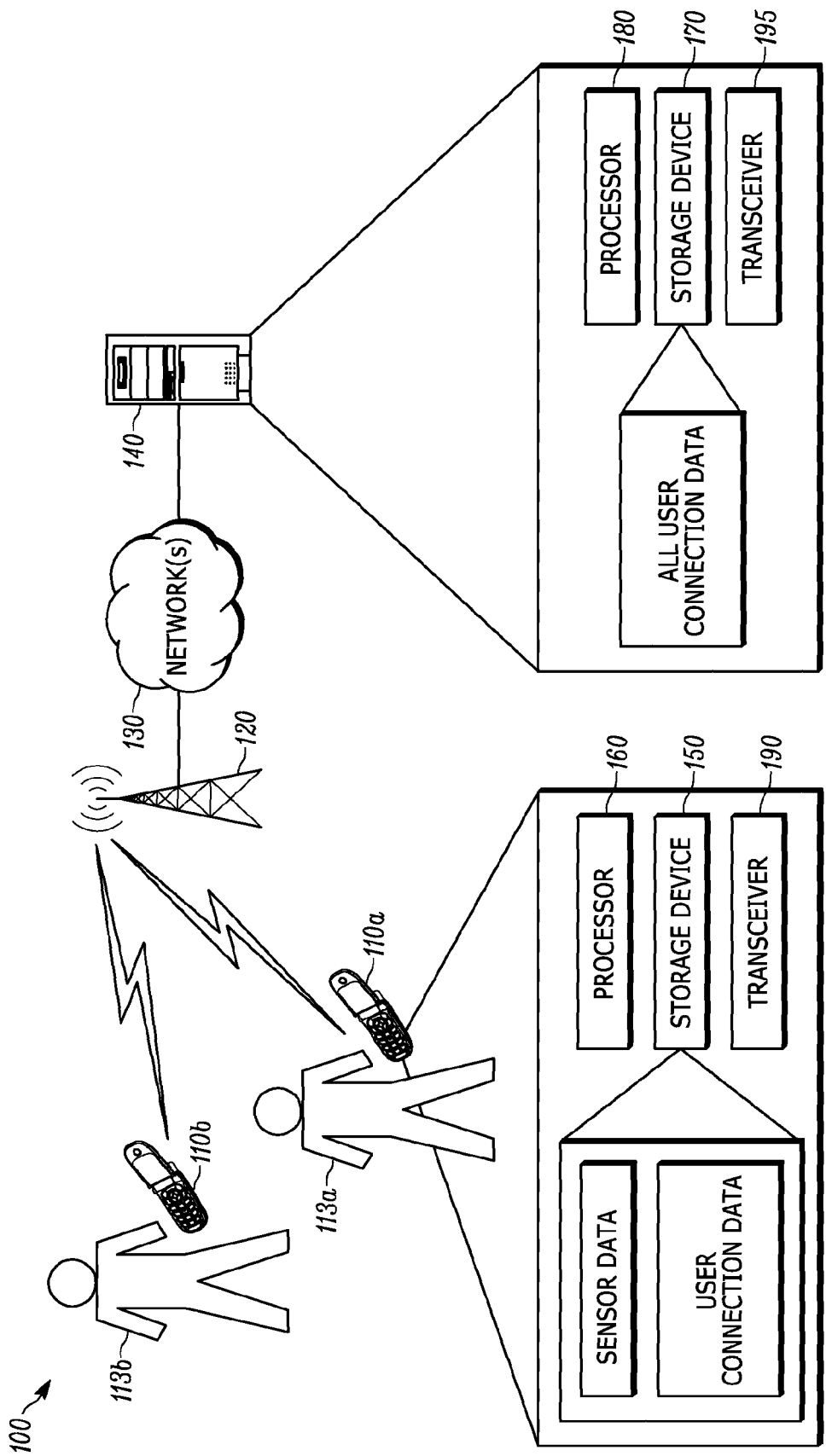
FIG. 1 illustrates an example apparatus for determining network connectivity in accordance with an embodiment of the disclosure.

There are provided herein methods for determining a network connection schedule for reduced performance environments. A population of mobile devices dynamically measures a radio frequency (RF) environment and correlates RF environment performance (e.g., radio-link outages) with RF frequency, assigned communications channel and codes, associated network cell-site, geographic location of the mobile device, time-of-day, day-of-week and RF outage duration. This radio-link performance data is reported to a centralized data service (e.g., cloud server) by each mobile device. Mobile devices are configured to generate the RF connection data and to send to the centralized data service. Additionally, each mobile device is configured to receive network connection information from the service as generated by centralized network service using data produced by the population of mobile devices across the network. When an RF outage is experienced by a particular mobile device, the device can reference the network connection information it has to make informed estimations about the likely duration of an outage and when it should attempt a network reacquisition of its connection and the frequency of attempts it should make.

Wireless radio networks or mobile networks are designed to cover geographic areas or locations to serve customers or users with mobile devices as they move around. Networks are designed with radio link budgets (e.g., RF energy) to and from mobile devices. Design considerations include geographical coverage (e.g., enough RF energy to make a link to and from mobile devices within an area or cell) and capacity (e.g., the ability to access a channel and transmit and receive communications to many mobile devices simultaneously).

However, sometimes there are exceptional environments or reduced performance environments within a mobile network that a different from typical "worst-case" environments. Such reduced performance environments include, for example, movie theaters, basements, etc. Detrimental characteristics associated with these reduced performance environments may include loss of radio link or connectivity, an accelerated depletion of mobile device battery capacity, warming of mobile device, etc. An example of a reduced performance environment is a user sitting inside a movie theater. During the movie, a user may receive no updated notifications, no texts or incoming calls and notice that his pocket is warm due to the mobile device's high heat. The user may notice that his mobile device's battery is depleted making his phone unable to use once the movie is over.

Fundamentally, a mobile radio network's design does not always account for special case RF circumstances (e.g., reduced performance environments) within its geography. Such accounting may be impractical, as new buildings, rooms, basements, etc. may be built after a network has been designed. Even if the network designer had perfect, up-to-date information, it may remain too costly and impractical to modify the network to account for changes. Hence, the network would remain unchanged and outages would occur for come devices some of the time.

Currently, the mobile device's ability to address this problem autonomously is limited. Because the outage condition usually does not last very long, the device should continue to seek and reestablish a connection to the network.

However, for special case RF circumstances this solution is less than ideal. Consequently, if the mobile device had knowledge of the existence of these reduced performance environments, their geographic location, and the typical and likely durations of such communication outages, the device could manage itself and its energy consumption far more efficiently. The present disclosure provides methods of obtaining and using such information using crowd-sourced data from a plurality of mobile devices.

FIG. 1 illustrates an apparatus 100 for determining network connectivity according to an embodiment. As shown in FIG. 1, apparatus 100 can include a mobile device 110a, which can be used by a user 113a. A mobile device 110 can communicate with a remote server 140 via wireless network 120 and network(s) 130. Wireless network 120 can represent a cellular service provider's wireless network. Wireless network 120 can use one or more network(s) 130 to communicate with remote server 140. Network(s) 130 can include one or more private networks, such as a corporate intranet, and/or one or more public networks, such as the Internet.

Mobile device 110a can include a transmitter or transceiver 190 configured to transmit radio signals, e.g., over a wireless network. Mobile device 110a can represent a cellular phone, a smart phone, or some other mobile computerized device, such as a personal digital assistant, tablet computer, laptop, handheld gaming device, digital camera, etc. Mobile device 110a, as shown in FIG. 1, can include a variety of sensors (not shown or labeled), such as an accelerometer, light sensor, proximity sensor, camera, Global Positioning Satellite (GPS) receiver, or microphone.

Electronic or mobile devices 110a are configured to know the following:
(1) Where they are (geographic location) or where they were most recently (what cell they are in or geographic location).
(2) When they have lost a network connection and are repeatedly attempting to reacquire it.
(3) How long the outage has occurred (when it began) and when it is ultimately reacquired (outage duration).

This information may be referred to generally as network connection data for the mobile device 110a.

A storage device 150 in mobile device 110 a can store collected sensor data. Storage device 150 can also store the user connection data that may include previous device radio-link performance and outages, the number of reconnection attempts, expected durations of such outages, the time of day, day-of-week, mobile network cell-site information and the associated geographic location of each. When a mobile device encounters a radio-link outage, a processor 160 can refer to its stored user connection data and using its last known location, determine or infer the likely time it will take to reestablish a radio-link connection.

For example, upon referring to its stored user connection data and its last known location, the mobile device 110a may determine that no known expected outage profile is associated near its location and thus, the mobile device 110a may continue to attempt to reconnect to the network in a sequence with some periodic frequency.

On the other hand, if a mobile device 110a enters a movie theater without a sufficiently strong radio signal, it may encounter a radio-link outage. It could refer to its stored user connection data and using its last known location, a, based on the experiences of other mobile devices using the network, it could determine that it may likely be unable to reestablish a radio link for 140 minutes (e.g., the duration of a typical movie and pre-movie ads). In this way, the mobile device 110a can utilize knowledge from other mobile user's previous experiences and thus avoid continuously attempting to reestablish a data link connection throughout the duration of the movie, thereby avoiding draining energy from its battery unnecessarily in a sequence of fruitless attempts throughout the 140 minutes. The mobile device 110a may attempt to reestablish a connection at time intervals before its "expected" reconnection time (e.g., at intervals up to the 140 minute duration). Upon reaching the 140-minute duration, the device 110a may initiate more frequent radio-link reconnection attempts. Once a network connection is reestablished, the mobile device 110a can transmit details of its location, recent radio signal performance, radio-link outage start time, outage stop time (outage duration), reconnection attempts, time-of-reconnected attempts, etc. to the remote server 140 via transceiver 190.

At the remote server 140, mobile device location and all related radio-link outage and network connectivity-related data can be stored at a storage device 170 for each of a plurality of devices. For example, location connectivity can also be received and stored from one or more other mobile devices 110 b. The stored connectivity data can be associated with metadata identifying, e.g. a location; mobile network cell identification; radio-link outage start, stop and outage durations, time and attempts to reestablish a network connection after an outage; user identify and device type. A processor 180 at remote server 140 can appropriately aggregate, process and organize individual mobile connection data and produce network connectivity data that comprises expected radio-link outage profiles for all geographic locations. The processed all user network connection data can be transmitted back to each mobile device 110a via transceiver 195, and mobile device 110a can use the processed network all user connection data to determine how to proceed with connecting to network 130 whenever it experiences a radio-link outage.

Transceiver 190 draws power from the battery (not shown) of the device 110. In some examples, the transceiver 190 and the processor 160 draw more power from the battery (not shown) when communicating with resources on the network 130. For example, when the device 110 sends a query to the server 140 trying to connect to the network 130, both the transceiver 190 and the processor 160 may consume more power than when the transceiver 190 and processor 160 are idle, e.g., not communicating with resources on the network 130.

Figure 2:
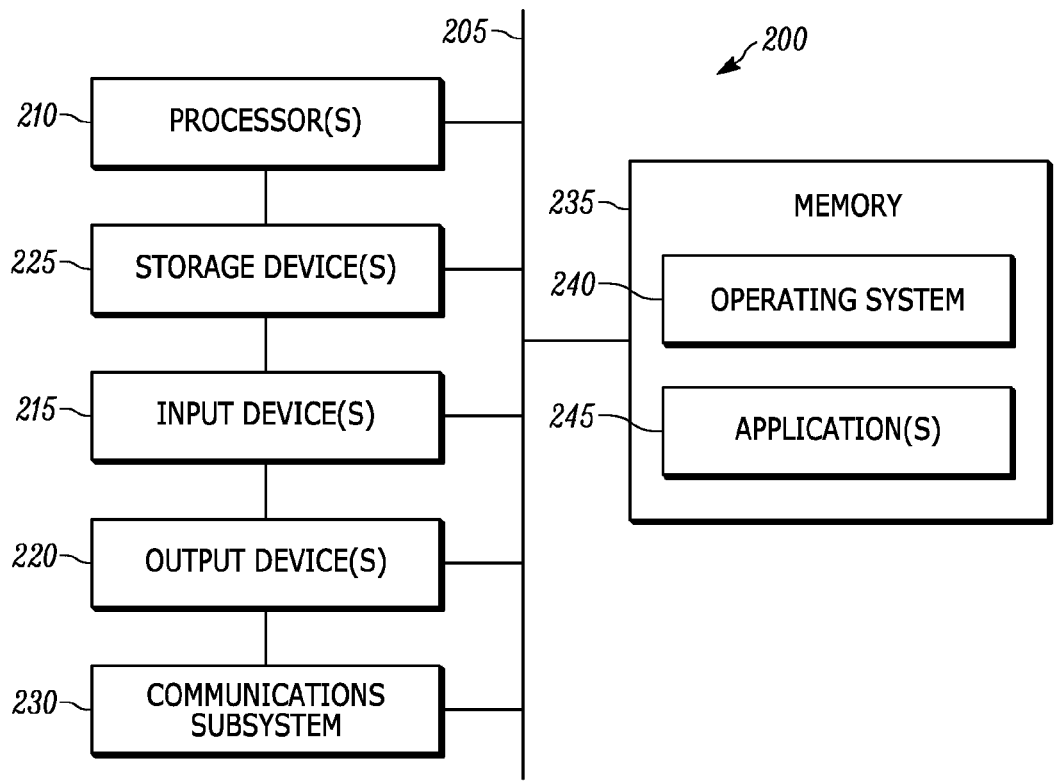
FIG. 2 illustrates an example of a computer system in accordance with an embodiment of the disclosure.

A computer system as illustrated in FIG. 2 can incorporate as part of the previously described computerized devices. For example, computer system 200 can represent some of the components of the mobile devices 110 and/or the remote computer systems or servers 140 discussed in FIG. 1. FIG. 2 provides a schematic illustration of one embodiment of a computer system 200 that can perform all or part of methods described herein the methods described herein. It should be noted that FIG. 2 is meant only to provide a generalized illustration of various components, any or all of which may be utilized as appropriate. FIG. 2, therefore, broadly illustrates how individual system elements may be implemented in a relatively separated or relatively more integrated manner.

The computer system 200 is shown having hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a mouse, a keyboard and/or the like; and one or more output devices 220, which can include without limitation a display device, a printer and/or the like.

The computer system 200 may further include (and/or be in communication with) one or more storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 230 may permit data to be exchanged with a network (such as the network described below, to name one example), other computer systems, and/or any other devices described herein. In many embodiments, the computer system 400 will further comprise a working memory 235, which can include a RAM or ROM device, as described above.

The computer system 200 also can include software elements, shown as being currently located within the working memory 235, including an operating system 240, device drivers, executable libraries, and/or other code, such as one or more application programs 245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computer system, such as the system 200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.) then takes the form of executable code.

As provided above, in reduced performance environments, the user has moved into geographic location in which the wireless network's RF energy (to and from mobile devices) has been reduced substantially such that the voice/data link has been lost or greatly diminished in performance. This same situation can occur when a mobile device leaves a network's coverage area. Both the mobile device and network have been designed together such that the mobile device should have basic device-to-network base station communications whilst operating within the network's covered area of service. Consequently, the mobile device repeatedly attempts to maintain a network connection or, if lost, to quickly reacquire a network connection (e.g. a radio link to and from the device) and to determine what location or cell it is in, so that the mobile device knows what RF channels and times/codes to use for communications.

Even though the user may not be necessarily actively using the mobile device (e.g., it may be asleep with the screen off in the user's pocket), the mobile device's transceiver 190 continues to attempt to reacquire an RF link. In doing so, the transceiver 190 may continue to send and receive data to and from a mobile device's processor 160, which can cause frequent "wake-ups" of the processor (e.g., moving it from sleep-state to active state). Consequently, the mobile device's processor 160 is on and running frequently, using considerable and unnecessary, which decreases the battery's stored energy reserve and also increases the heat of the mobile device.

In typical network situations, the repeated attempts by the mobile device to reacquire a network connection is sensible, as most loss of communications last for a short time until the device reacquires a RF link to/from the network. As such, the reduction in the battery's stored energy is small and the user has the impression of excellent, even uninterrupted, communications.

A simple solution for conserving the energy in a battery when a radio-link outage is experienced is to reduce the frequency at which the transceiver 190 sends queries to connect to the network 130, and to reduce the query frequency even further based on the remaining energy (e.g., remaining charge) of the battery (not shown). For example, when the battery energy level is mostly or fully charged, the transceiver 190 can send queries at a high frequency, e.g., once every ten seconds. When the battery is mostly depleted, the transceiver 190 can send queries at a lower frequency, e.g., once every minute. In this way, the frequency at which the server 140 is polled has a relationship to a characteristic of the battery's stored energy status of the device 110.

Figure 3:
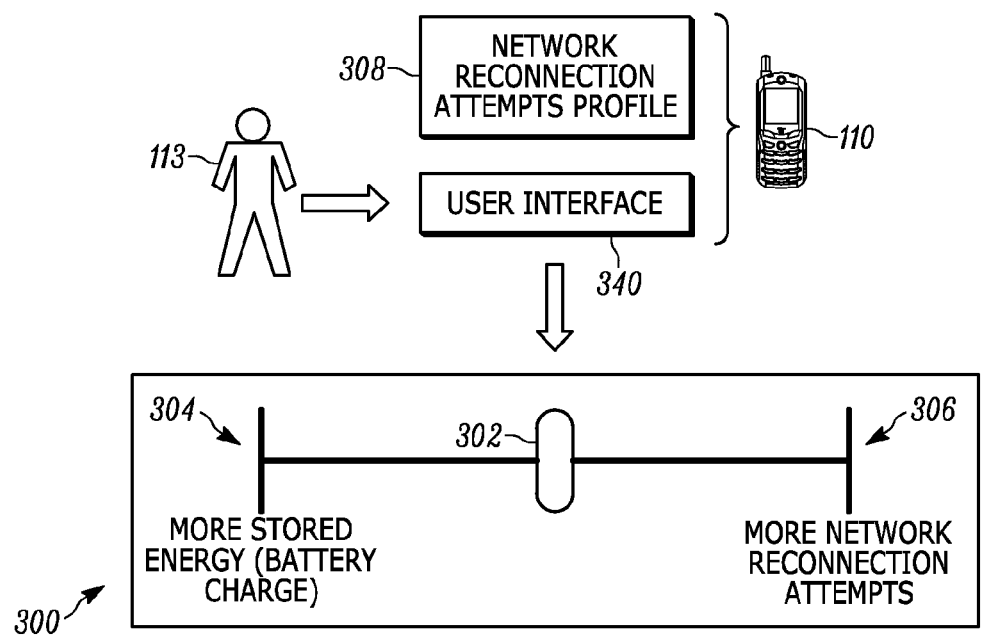
FIG. 3 illustrates an example polling profile and associated user interface in accordance with an embodiment of the disclosure.

FIG. 3 illustrates an example network reconnection attempts profile 308 and associated user interface 340. In some embodiments, the frequency of making network connection attempts (e.g., querying) can be determined by a network reconnection attempts profile 308. The network reconnection attempts profile 308 can contain any data relevant to the relationship between network connection attempts frequency and energy level status. As the transceiver 190 polls the server 140, the transceiver 190 can consult the network reconnection attempts profile 308 to calculate a network reconnection attempts frequency on an ongoing basis.

In some embodiments, the device 110 provides user interface 340 enabling a user 113 to configure the network reconnection attempts profile 308. FIG. 3 shows an example view 300 of a portion of the user interface 340. The user interface 340 includes a slider 302 which can be adjusted by a user to indicate a ratio of battery energy status to network reconnection attempts frequency. If the user 113 moves the slider 302 closer to a position 304 to the right, the network reconnection attempts frequency can be weighted in favor of higher network reconnection attempts frequency (and thus potentially lower battery life). If the user 113 moves the slider 302 closer to a position 306 to the left, the network reconnection attempts frequency can be weighted in favor of lower network reconnection attempts frequency (and thus potentially higher battery energy level/status).

While the solution presented in FIG. 3 may help retain more battery energy level with user input, it is imperfect as it will not necessarily result in the mobile device reestablishing a connection to the network and it requires the user to actively take steps to change the polling frequency.

Figure 4:
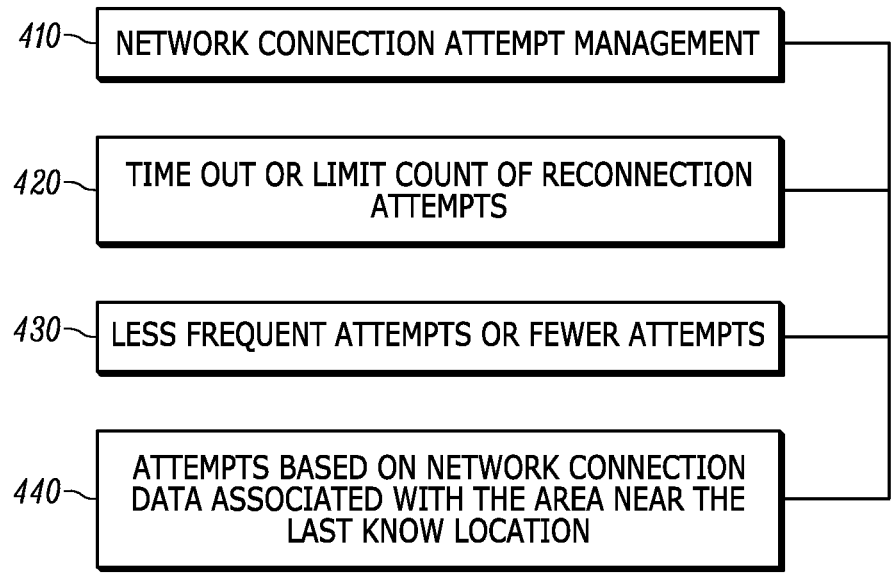
FIG. 4 illustrates an example of various network connection attempt management protocols in accordance with an embodiment of the disclosure.

Additional solutions are provided in FIG. 4, which illustrates an example of various network connection attempt management protocols 410 in accordance with an embodiment of the disclosure. In protocol 420 the mobile device times out or limits the count of reconnection attempts with a network. For example, the mobile device could be reprogrammed to autonomously stop trying to reacquire a radio link connection when it encounters a situation with lost connection (or some time-out or count of repeated reconnection attempts). However, this may be undesirable as the user may leave the environment that caused the loss of radio signal, but the user's mobile device would remain unconnected, as it would have stopped trying to connect.

In protocol 430 the mobile device may be reprogrammed to have less frequent or fewer reconnection attempts with a network. This solution may be better than no reconnection attempts, but it is likely to result in a poor user experience for most mobile device users. For example, the mobile device would still waste energy when in a poor RF environment while executing a blind sequence of reconnection attempts and may remain unconnected for a long time after the user has exited the poor environment.

In protocol 440 the mobile device could be reprogrammed to perform connection attempted based on network connection data associated with the area for the last known device location. Such protocol 440 is described in further detail with respect to FIGS. 5-8.

Figure 5:
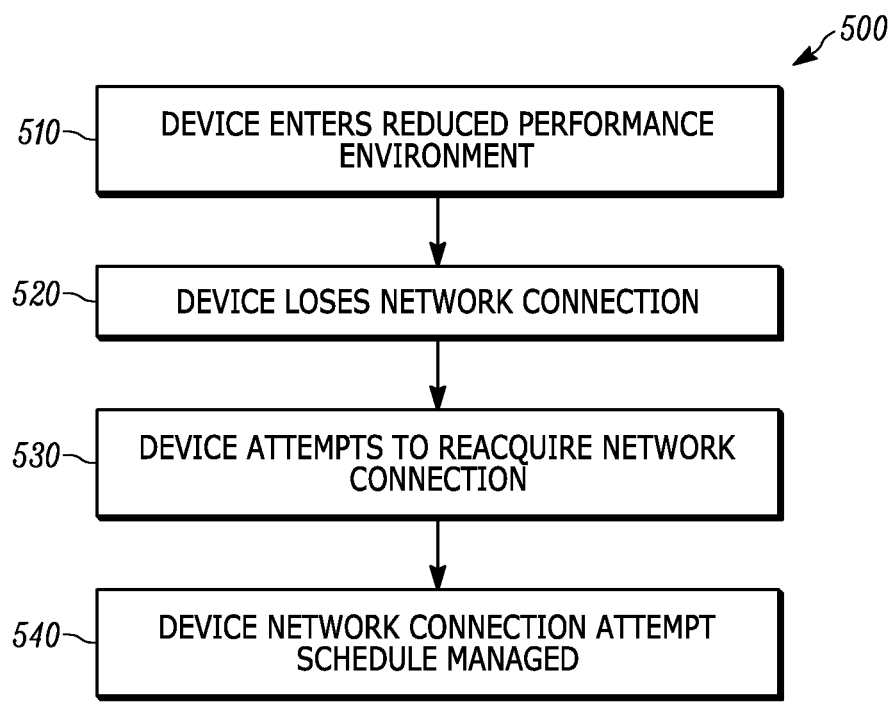
FIG. 5 illustrates an example overview of an electronic device attempting to reconnect to a network in accordance with an embodiment of the disclosure.

FIG. 5 illustrates an example overview process 500 of an electronic device attempting to reconnect to a network in accordance with an embodiment of the disclosure. At operation 510, a mobile electronic device enters into a reduced performance area. As provided above, a reduced performance area is one where the radio-link to and from a mobile device is insufficient to maintain a network connection to provide information services between a mobile device and the network (e.g. calling, texting and various data services). Such performance areas may be too small or special to be addressed by a mobile network operator (e.g. special buildings, basements, theaters, elevators, etc.).

At operation 520, the mobile device loses connection to the network. By loss of connection, it is meant a reduced performance area is one where the radio-link to and from a mobile device is insufficient to maintain a network connection to provide information services between a mobile device and the network (e.g. calling, texting and various data services).

At operation 530, the mobile device attempts to reacquire a network connection. This is performed according to standard protocols, such as retry until a connection is established between a mobile device and an associated radio network (e.g. base station).

At operation 540, the mobile device's network reconnection attempt schedule is managed. In some embodiments, operation 540 is prompted upon a certain number of failed attempts to reconnect. In some embodiments, operation 540 occurs upon operation 520.

Figure 6:
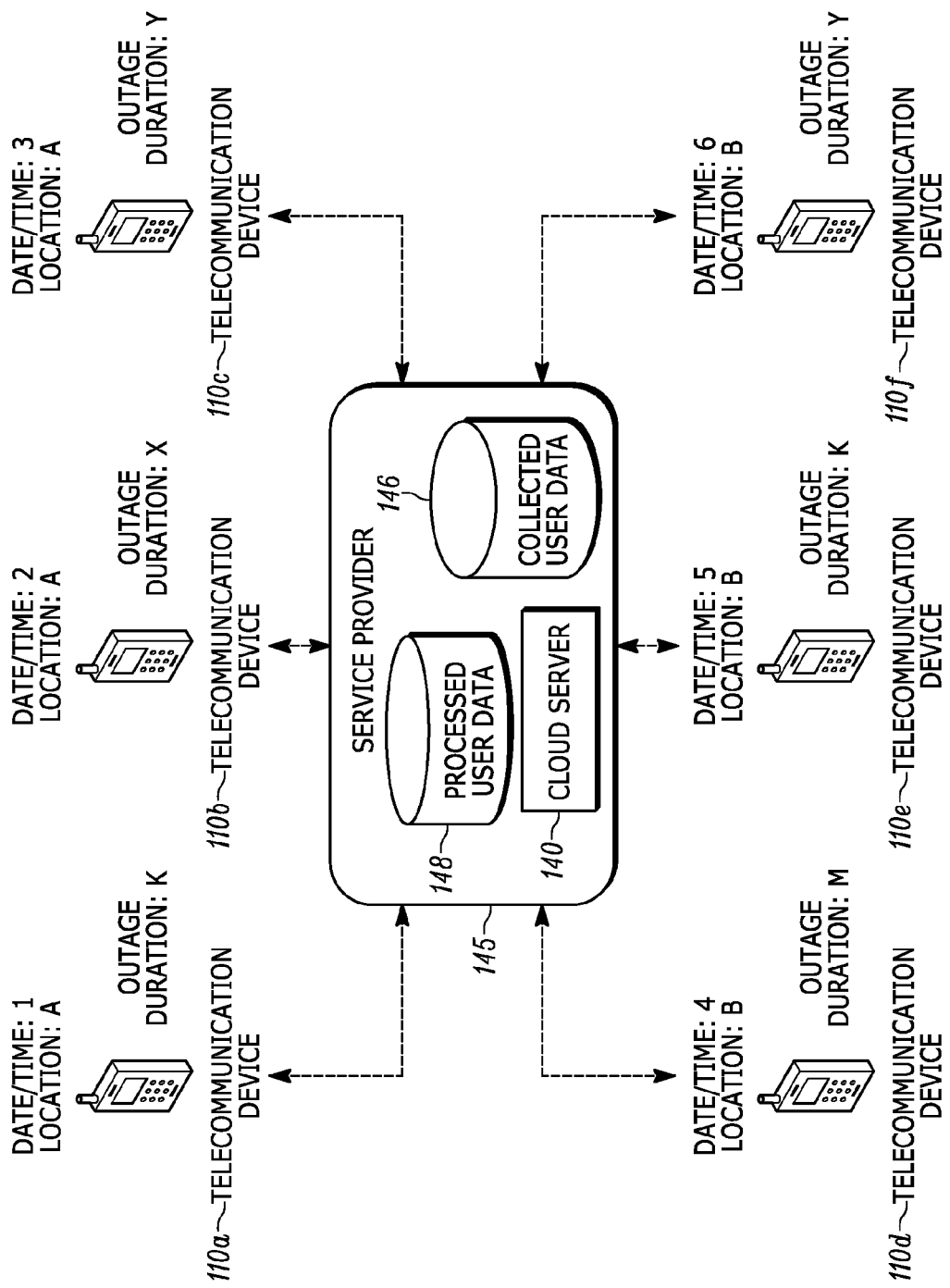
FIG. 6 illustrates an example system that receives device data from mobile devices and builds histograms from the device data, in accordance with an embodiment of the disclosure.

FIG. 6 illustrates an example system that receives device data from mobile devices and builds histograms from the device data, in accordance with an embodiment of the disclosure.

As shown in FIG. 6, a service provider 145 may be connected to electronic device 110a and a plurality of other electronic devices 110b-f and may receive device data from the electronic device 110a and electronic devices 110b-f. Collected user data storage 146 of the service provider 145 stores the plurality of received user device data. In some embodiments, collected user data storage 146 includes raw or unprocessed user data collected from the devices 110. As shown, service provider 145 also includes processed user data storage 148, which stores processed user data. For example, processed user data storage 148 may include data representative of, derived from, or manipulated from collected user data storage 146. Such processing may be performed at or by cloud server 140 or by any other suitable device/location. The service provider 145 may then provide the processed user data to the electronic device 110a and electronic devices 110b-f via cloud server 140.

As shown, each of the electronic devices 110a-f may be associated with different device data. For example, electronic device 110a has a location 'A' and an outage duration 'K.' As used herein, outage duration refers to the amount of time an electronic device is not connected to a network. Electronic device 110b has a location 'A' and an outage duration 'X.' Electronic device 110c has a location 'A' and an outage duration 'Y.' Electronic device 110d has a location 'B' and an outage duration 'M.' Electronic device 110e has a location 'B' and an outage duration 'K.' Electronic device 110f has a location 'B' and an outage duration 'Y.'

In various implementations, the cloud server 140 retrieves or receives the device data from the electronic device 110a and electronic devices 110b-f. The cloud server 140 may perform the retrieving on some sort of basis, such as a periodic basis. Upon receiving the device data, the cloud server 140 may simply provide the collective data to the electronic device 110a and electronic devices 110b-f as network data or may process the device data to generate network data. For example, such processed user data including outage location and lost connection duration may be used to generate a network reconnections attempts profile. The reconnection attempts profile may provide user devices information specific to outage locations, such as how long the lost connection duration lasted for all devices (e.g., in percentile form). This reconnection attempts profile could then provide information for a disconnected user device to estimate a probability to attempt reconnecting to the network. As used herein, the terms "remote server" and "cloud server" are used interchangeably and are meant to describe a "centralized computer and storage" in the network.

In some embodiments, the cloud server 140 compiles network connection data that includes a histogram of the expected radio-link outage durations for mobile devices at all geo-locations of reported reduced RF performance environments within the network. The data is compiled and information such as outage duration, signal strength, time of day, day of week, etc. may be used to determine a network connection attempt schedule for electronics devices in the reduced performance environment.

In some embodiments, the outage duration may vary. For example, the outage duration may last a first length of time (e.g., 0 to 10 minutes) and then a second length of time (e.g., 20 to 100 minutes). This data would indicate that a disconnected user could try to connect after 10 minutes and keep trying through 20 minutes. If the reconnection is not successful, the device could go to sleep and then try again reconnecting after 100 minutes until it is successful.

In other embodiments, the outage duration may last a first length of time (e.g. 0-5 minutes), a second length of time (e.g., 10-30 minutes), and a third length of time (e.g., 50-150 minutes). This data would indicate that a disconnected user could try to connect after 5 minutes and keep trying through 10 minutes. If the reconnection is not successful, the device could go to sleep and then try again reconnecting after 30 minutes and keep trying through 50 minutes. If the reconnection is not successful, the device could go to sleep and then try again reconnecting after 150 minutes and keep trying until it is successful.

Other outage variations and durations may occur. Additionally, the percentage or number of users that are successful in reconnecting may vary, providing the user device an additional metric for estimating a probability to attempt reconnecting to the network. For example, if 20% of users are successful in attempting to reconnect to a network after 20 minutes and 85% of users are successful in attempting to reconnect to the network after 45 minutes, the disconnected user device may device to attempt to reconnect a few times after 20 minutes, and if not successful, wait until after 45 minutes and attempt until successful.

In a short amount of time, data outages, the likely locations of the outages, the number of outages, and a histogram of the population's loss of connection start and stop times (outage durations) per location (e.g., likely average outage, standard deviations, percentiles of outages, etc.) would be known to the cloud server 140, as it is continuously collecting data from mobile devices that have experienced longer than normal loss of connections. The data or processed data can then be communicated back to all mobile devices for all cells. Consequently, knowledge of locations of reduced performance environments and the likely duration of the loss of connection for each would be known to the mobile devices.

Figure 7:
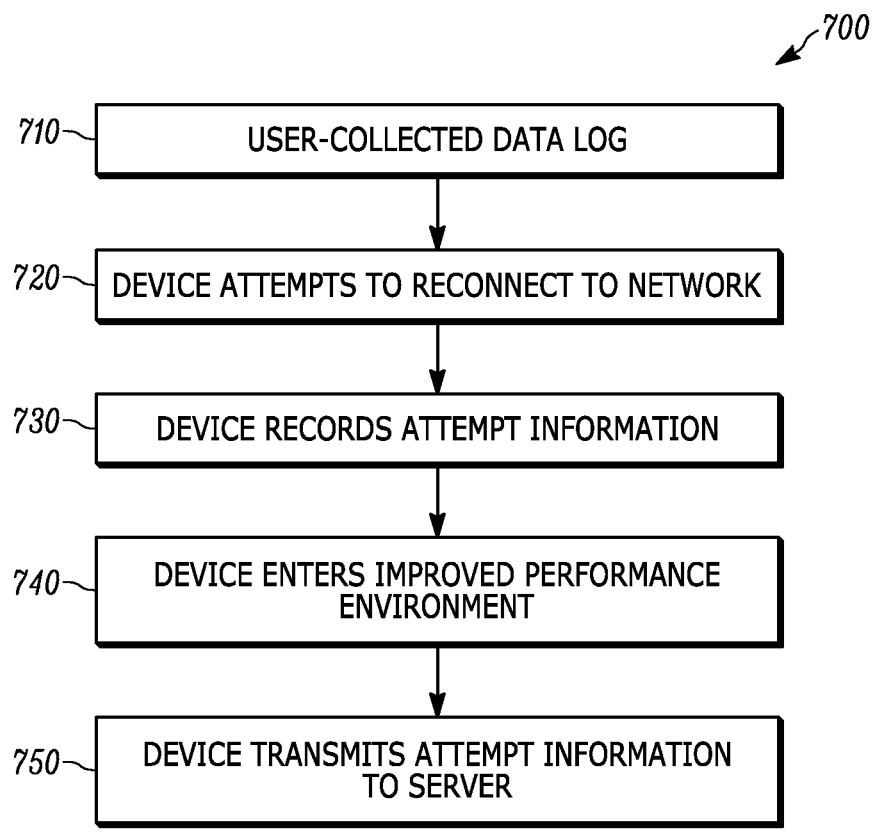
FIG. 7 illustrates an example procedure for constructing a user-collected data log in accordance with an embodiment of the disclosure.

FIG. 7 illustrates an example procedure 700 for constructing a user-collected data log in accordance with an embodiment of the disclosure. At operation 710, an electronic device begins collecting the user-collected data log 710. This occurs once the electronic device is disconnected from a network.

At operation 720, the device attempts to reconnect to a network. At operation 730, the device records its attempt information, including, for example, the number of times it tries to reconnect, the outage duration, etc. In some embodiments, the attempt information is stored on the device itself.

At operation 740, the device enters an improved performance environment. In the improved performance environment, the device is able to reconnect or reestablish a connection with a network.

At operation 750, the device transmits the recorded attempt information to a remote server, e.g. cloud server. The recorded attempt information may be automatically transmitted upon reconnection with the network or at a suitable time, such as when the connection is strong and/or the device has high battery power.

Figure 8:
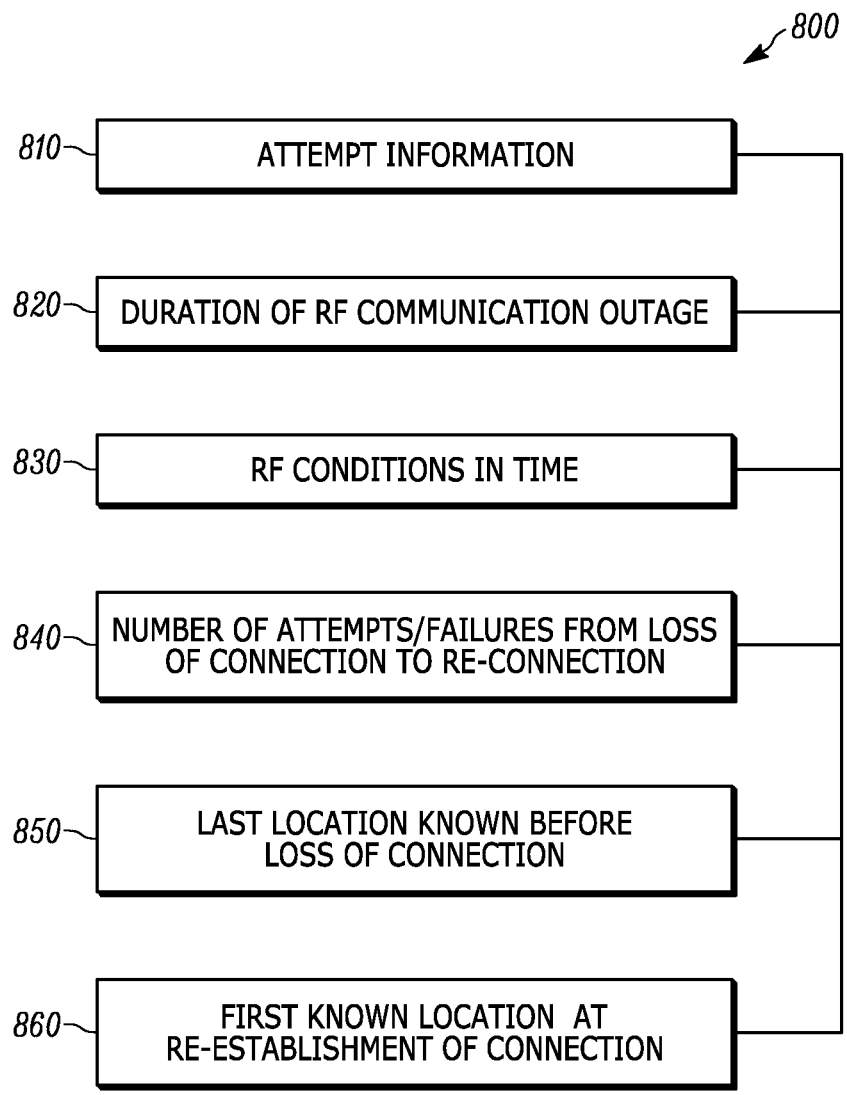
FIG. 8 illustrates an example of various network attempt information in accordance with an embodiment of the disclosure.

FIG. 8 illustrates an example 800 of various network attempt information 810 in accordance with an embodiment of the disclosure. As shown, attempt information 810 may include duration of RF communication outage (or radio-link outage) 820, RF conditions in time (e.g., the time-of-day, day-of-week, and/or day-of-year associated with the RF communication outage) 830, the number of attempts/failures to reestablish a connection (e.g. time duration from loss of connection to the reestablishment of a reconnection) 840, last location known before the mobile device experienced a loss of connection (cell ID, geolocation) 850, first known location of the mobile device at the time of a reestablishment of a connection (cell ID, geolocation) 860, etc.

Figure 9:
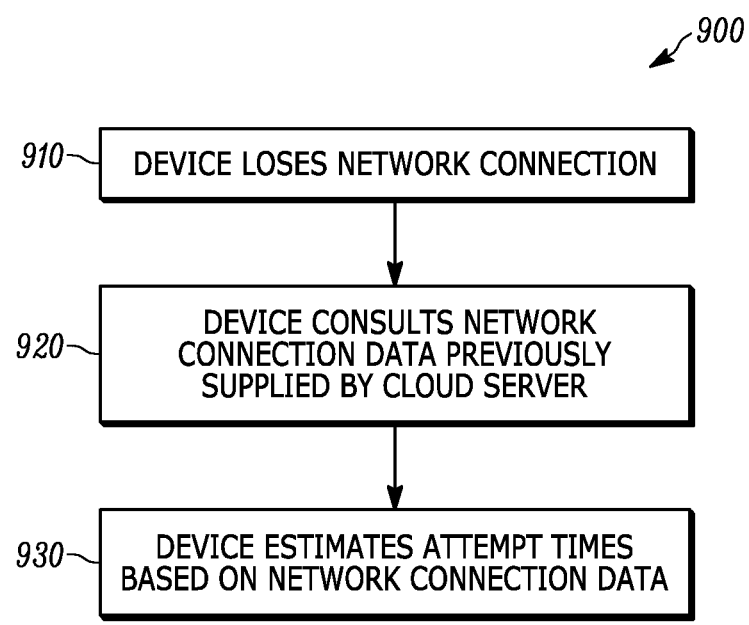
FIG. 9 illustrates an example procedure for attempting to reconnect to a network in accordance with an embodiment of the disclosure.

FIG. 9 illustrates an example procedure 900 for attempting to reconnect to a network in accordance with an embodiment of the disclosure. At operation 910, an electronic device loses a network connection, e.g. enters a reduced performance environment.

At operation 920, the electronic device consults user data supplied by a server (e.g. network connection data supplier by a cloud server). For example, a cloud server may send a plurality of user data to the electronic device for reduced performance environments. The cloud server may periodically send the network connection data to each mobile device at some interval of time (e.g. everyday at noon), or when encountering some event (when a mobile is first powered-on or enters a network), etc. The plurality of user data may include individual user data previously sent from individual mobile devices to the cloud server indicating outage locations, reconnection attempts and reconnection times.

In some embodiments the device could recognize that its last known location before losing communication correlates with a nearby or exact known location of RF problems. The device could see a histogram for the population of users who have experienced outages at that location.

In some embodiments, at operation 920, the device receives histogram data for the plurality of user data including location and lost connection duration. The histogram data is specific to each geographic location, having an x-axis for the percentile of users and a y-axis for lost connection duration for the geographic location.

Depending upon which data is sent to the mobile device, the mobile device can determine a network attempt schedule using that data. Such network attempt schedule allows the device to estimate retry times instead of blindly retrying in a constant loop. As shown, at operation 930, the device estimates attempt times based on network connection data. For example, the network attempt schedule may include an estimate of times for attempting to reconnect to the network based on the histogram data for each geographic location. In such embodiments, the mobile device may determine its geographic location based on outage locations and last known location.

As an example, based on a histogram, the average reacquisition of an RF connection is 1 hour and 50 minutes—the time for a typical movie and pre-movie ads. The device could make a few periodic attempts before the average reacquisition time and then make more frequent attempts at some time after the average reacquisition time.

In other embodiments, the network attempt schedule includes an estimate of times for attempting to reconnect to the network based on a median reconnection time determined from user data. In still other embodiments, the network attempt schedule includes a first predetermined number of attempts before the average reconnection time determined from user data and a second predetermined number of attempts after the average reconnection time determined from user data. The first predetermined number of attempts may be less than the second predetermined number of attempts. The first predetermined number of attempts may be at a lower frequency than the second predetermined number of attempts.

The mobile device thereafter attempts to reconnect to the network according to the network attempt schedule until the mobile device is reconnected to the network. Upon successfully connecting to a network, the mobile device transmits its radio-link connection data (its history of experience) to be added to the plurality of user data that comprises the network connection data.

Although described specifically throughout the entirety of the instant disclosure, representative embodiments have utility over a wide range of applications, and the above discussion is not intended and should not be construed to be limiting, but is offered as an illustrative discussion of aspects of the disclosure. What has been described and illustrated herein are embodiments of the disclosure along with some of their variations. The terms, descriptions and figures used herein are set forth by way of illustration only and are not meant as limitations. Those skilled in the art will recognize that many variations are possible within the spirit and scope of the disclosure, wherein the disclosure is intended to be defined by the following claims—and their equivalents—in which all terms are mean in their broadest reasonable sense unless otherwise indicated.

What is claimed is:

1. A method comprising:
    entering a reduced communications performance environment, wherein a mobile device connected to a network loses connection to the network;
    attempting to reconnect to the network in the reduced performance environment without success;
    recording network connection attempt information, including at least a geographic location of the mobile device;
    entering an improved performance environment, wherein the mobile device is reconnected to the network; and
    transmitting the network connection attempt information to a remote server, the network connection attempt information including a last known location of the mobile device before losing connection to the network and a duration of the lost connection.

2. The method of claim 1, wherein attempting to reconnect to the network comprises moving a processor in the mobile device from a sleep state to an active state and transmitting a request via a radio link, and wherein each attempt to reconnect to the network consumes energy from a battery of the mobile device.

3. The method of claim 1, wherein the network connection attempt information further comprises at least one of radio frequency network conditions, a time-of-day, day-of-week, or date.

4. The method of claim 1, wherein the network connection attempt information further comprises at least one of radio frequency conditions in time, a number of attempts or failures from loss of connection to reconnection, a first known location at reconnection, a histogram of time for previous users in the reduced performance environment who have experienced an outage and have reconnected, or data of known network outage locations.

5. The method of claim 1, wherein the reduced performance environment comprises an environment outside a network coverage area of the mobile device.

6. The method of claim 1, wherein the reduced performance environment comprises an environment where a voice or data link between the mobile device and network has been lost.

7. The method of claim 1, wherein the remote server is a cloud server configured to receive network connection attempt information from a plurality of mobile devices and which generates a histogram of expected radio-link outage durations for mobile devices at all geo-locations of reported reduced radio frequency (RF) performance environments within the network, the histogram providing compiled data that is used to determine a network connection attempt schedule for electronics devices in a reduced performance environment.

8. A method comprising:
    consulting a network reconnection attempts profile previously sent from a cloud server to a mobile device;
    based on the network reconnections attempts profile, determining a network reconnection attempt schedule; and
    attempting to reconnect to the network according to the network reconnection attempt schedule until the mobile device is reconnected to the network.

9. The method of claim 8, wherein the network reconnection attempts profile comprises a plurality of user data derived from individual user data previously sent from individual mobile devices to the cloud server indicating outage locations and lost connection duration information.

10. The method of claim 8, wherein the network reconnection attempt schedule comprises an estimate of times for attempting to reconnect to the network based on a median reconnection time determined from user data.

11. The method of claim 10, wherein the network reconnection attempt schedule comprises a first predetermined number of attempts before the median reconnection time determined from user data and a second predetermined number of attempts after the median reconnection time determined from user data.

12. The method of claim 11, wherein the first predetermined number of attempts is less than the second predetermined number of attempts.

13. The method of claim 11, wherein the first predetermined number of attempts is at a lower frequency than the second predetermined number of attempts.

14. The method of claim 10, wherein the network reconnection attempt schedule comprises an estimate of times for attempting to reconnect to the network based on histogram data for each outage location.

15. The method of claim 14, wherein the mobile device determines its geographic location based on outage locations and last known location.

16. The method of claim 14, wherein the mobile device accesses lost connection duration from the histogram data using its geographic location to determine the network reconnection attempt schedule.

17. The method of claim 14, wherein the network connection attempt information comprises radio frequency conditions in time, a number of attempts or failures from loss of connection to reconnection, a first known location at reconnection, a histogram of time for previous users in a reduced performance environment who have experienced an outage and have reconnected, and data of known network outage locations.

18. The method of claim 8, wherein the network connection attempts profile comprises a histogram of the plurality of user data.

19. The method of claim 8, further comprising:
transmitting the network reconnection attempt schedule to the remote server.

20. The method of claim 19, wherein the network reconnection attempt schedule further comprises location and lost connection duration information for the mobile device in a reduced performance environment.

21. The method of claim 8, further comprising:
determining a duration in which the mobile device may likely be unable to reestablish a radio link by referring to stored user connection data compiled based on previous experiences of other mobile devices using the network, whereby the mobile device avoids continuously attempting to reestablish a data link connection throughout the duration.

22. The method of claim 8, further comprising managing the network reconnection attempt schedule following a number of failed attempts by the mobile device to reconnect to the network.

23. The method of claim 8, further comprising: identifying an average reacquisition time; making a few periodic reconnection attempts before the average reacquisition time; and making more frequent reconnection attempts at some time after the average reacquisition time.

* * * * *